J. W. CAGLE & J. W. NICHOLS.
Baling-Press.
No. 220,802. Patented Oct. 21, 1879.
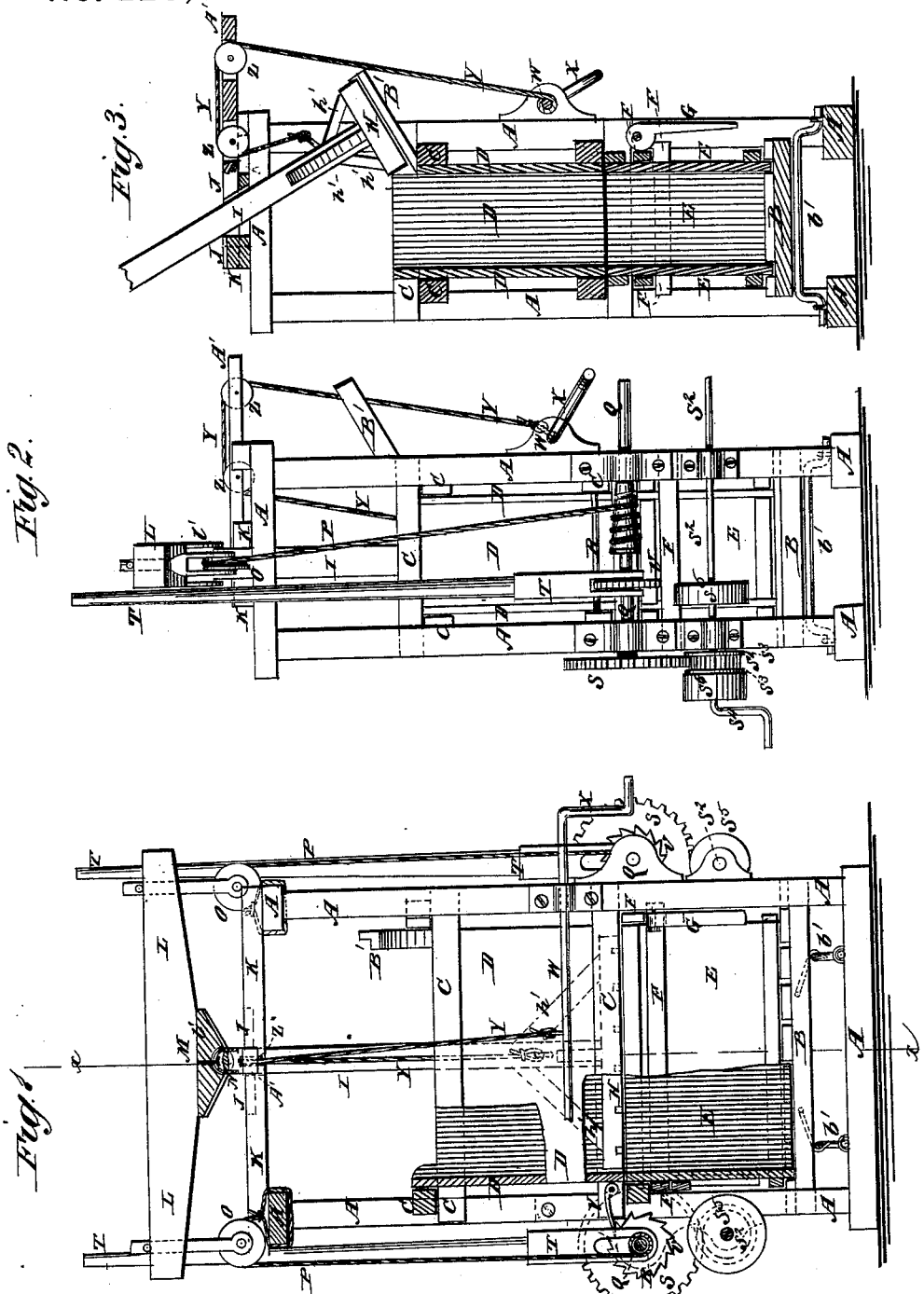
WITNESSES:
Francis McArdle
E. Sedgwick
INVENTOR:
J. W. Cagle
J. W. Nichols
BY Munn & Co
ATTORNEYS.

UNITED STATES PATENT OFFICE.

JACOB W. CAGLE AND JOSHUA W. NICHOLS, OF GREENVILLE, S. C.

IMPROVEMENT IN BALING-PRESSES.

Specification forming part of Letters Patent No. 220,802, dated October 21, 1879; application filed March 24, 1879.

*To all whom it may concern:*

Be it known that we, JACOB WASHINGTON CAGLE and JOSHUA WINGATE NICHOLS, of Greenville, in the county of Greenville and State of South Carolina, have invented a new and useful Improvement in Baling-Presses, of which the following is a specification.

Figure 1 is a side view of our improved press, partly in section, to show the construction. Fig. 2 is an end view of the same. Fig. 3 is a vertical cross-section of the same, taken through the line $x\ x$, Fig. 1.

Similar letters of reference indicate corresponding parts.

The object of this invention is to furnish an improved press for baling cotton, hay, straw, rags, bagging, hemp, &c., which shall be simple in construction, convenient in use, and rapid and powerful in operation.

The invention consists of certain novel features which will be first described in the specification, and then pointed out in the claims.

A is the frame of the press. B is the head-block, which rests upon the rods $b'$. The end parts of the rods $b'$ are bent into crank form, as shown in Figs. 1, 2, and 3, and are pivoted to the sills of the frame A.

With this construction the head-block B is adjusted into position to receive the pressure in pressing the bale by turning the crank-rods $b'$ into an upright position. When the bale has been pressed and tied the crank-rods $b'$ are turned down, which allows the bale to be removed without raising the follow-block.

To the middle part of the press-frame A are attached the bars C, to which the stationary upper part, D, of the casing is secured.

E is the detached lower part of the casing, the lower edges of the side and end parts of which are inserted in grooves in the head-block B, and their upper ends are secured in place and supported against the outward pressure by bars F, interposed between them and the posts of the frame A.

The bars F are locked in place by lever-cams G, pivoted to the posts of the frame A in such positions as to bear against the said bars F. By this construction the bars F and the casing E may be released by operating the cam-levers G, and may then be detached, and the bale readily removed from the press.

H is the follow-block, to the center of the upper side of which is securely attached the lower end of the stem or bar I.

The connection between the follow-block H and its stem I is strengthened by the braces $h'$, the upper ends of which are attached to the said stem I, and their lower ends are inclined outward and are attached to the follow-block H, so as to distribute the pressure over all parts of the said block H.

The stem I passes up through a guide-hole formed by attaching two short parallel cross-bars, J, to two parallel bars, K, attached to the top bars of the frame A. The guide-hole between the bars J K and the casing of the press-box causes the follow-block H and the stem I to move up and down vertically, and thus prevent binding.

The upper end of the stem I is rounded off into semi-cylindrical form, and fits into a semi-cylindrical notch in the casting $l'$ attached to the center of the lower side of the beam L.

The beam L is farther kept in place by a pin, M, that passes through the center of the casting $l'$ and through a slot in a strap or keeper, N, which passes over the top, and the ends of which are attached to the opposite sides of the said stem I.

To the lower sides of the ends of the walking-beam L are attached pulleys O, around which pass the ropes P. One end of the ropes P is attached to the top bars of the frame A. The other parts of the ropes P pass down at the ends of the press, and their ends are attached to the shafts Q at the larger ends of the cone-pulleys R attached to or formed upon the said shafts.

The cone-pulleys R are grooved spirally to guide the ropes P as they are wound upon them.

With this arrangement the follow-block H will be forced down with more speed during the first part of its descent when less power is required, and with less speed during the latter part of its descent when more power is required.

The shafts Q revolve in bearings attached to the lower part of the frame A in such a way that the said shafts may be slid longitudinally by the side pressure of the ropes P as they are wound upon them, so that the said ropes may always be drawn downward vertically, or nearly so.

To each of the shafts Q is attached a large gear-wheel, S, the teeth of which mesh into the teeth of the small gear-wheel S' attached to the shaft $S^2$. The shaft $S^2$ is placed parallel with the shaft Q, and revolves and slides in bearings attached to the frame A.

To the shafts $S^2$ at the sides of the gear-wheels S', or to the sides of the said gear-wheels S, are attached or upon them are formed plates or flanges $S^3$, for the sides of the gear-wheel S to bear against, so that the said shafts may be slid by and with the shafts Q.

The shafts $S^2$ may be revolved by means of cranks $S^4$ attached to them, or they may have pulleys $S^5$ attached to them to receive belts, so that they may be revolved by power. In the latter case they should have pulleys $S^6$ attached to them to receive a connecting-belt, so that they may move together.

This arrangement may be used during the first part of the descent of the follow-block H, when comparatively little power is required and speed is an object.

When more power is required the levers T are used, the heads of which are made of iron, have elongated holes or slots formed through their lower ends, to receive and ride upon the shafts Q.

The lower ends of the heads of the levers T are slotted longitudinally to receive the ratchet-wheels U, rigidly attached to the shafts Q. In the levers T, at the bottom of the slots in their lower ends, are formed teeth or notches, to engage with the teeth of the ratchet-wheels U, and thus give the said levers a firm hold upon the said ratchet-wheels U.

With this construction, by the use of the levers T, the follow-block H can be forced down with immense power.

The follow-block H is held in place and prevented from springing back while the levers T are being shifted by the pawls V, which are pivoted to the frame A, and which engage with the teeth of the ratchet-wheels U.

In bearings attached to the rear side of the frame A revolves a shaft, W, which also has a longitudinal movement in its bearings from the side pressure of the rope being wound upon it, and has a crank, X, attached to each end.

To the middle part of the shaft W is attached the end of a rope, y, which passes up at the rear side of the press and over two guide-pulleys, Z, pivoted in short slots in the bar A', attached to the top bars of the press. The other end of the rope Y is attached to the rear side of the lower part of the stem I.

With this construction, when the pawls V have been thrown back, and the crank-shaft W X is turned to wind up the rope Y, the follow-block H will be raised. As the follow-block H reaches the upper edge of the rear side of the casing D the side draft of the rope Y causes it to swing outward upon the inclined rabbeted bars B', attached to the rear upper part of the frame A, to receive it.

The guide-hole through the bars J K is beveled upon the alternate lower and upper sides to allow the stem I to take an inclined position as the follow-block H passes to the inclined bars B', as shown in Fig. 3. This construction leaves the upper end of the baling-box open, so that the substance to be baled can be conveniently put in.

Having thus described our invention, we claim as new and desire to secure by Letters Patent—

1. The combination of the follower-block H, provided with the stem I, the beam L, the pulleys O, the ropes P, the longitudinally-sliding shafts Q, and the spirally-grooved pulleys R, with each other and with the frame A, the ratchet V, and lever T, substantially as herein shown and described.

2. The combination of the crank-shaft W, the rope Y, the projecting bar A', and its pulleys Z, and the inclined bars B', with the stem I, of the follow-block H, the baling-box D, and the press A, substantially as herein shown and described.

3. The combination of the pivoted beam L, the concaved casting l', the pivot-pin M, the strap or keeper N, and the rounded end of the stem I, of the follow-block H, with each other and with the ropes P, substantially as herein shown and described.

4. The combination of the pulleys O, the rope P, and the beam L, pivoted to the end of the stem I, with the follow-block H, and with the ropes P, by means of which the power is applied, substantially as herein shown and described.

5. The combination of the gear-wheels S S', the plates or flanges $S^3$, and the shafts $S^2$, provided with the cranks $S^4$, and the pulleys $S^5$ $S^6$, with the shafts Q, the ropes P, the pivoted beam L, and the stem I, of the follow-block H, substantially as herein shown and described.

JACOB W. CAGLE.
JOSHUA W. NICHOLS.

Witnesses:
  M. F. ANSEL,
  A. J. MOSELEY.